(12) United States Patent
Oh et al.

(10) Patent No.: US 8,606,421 B2
(45) Date of Patent: Dec. 10, 2013

(54) STATISTICAL METHOD TO OBTAIN HIGH ACCURACY IN FORECASTING PLANT ENERGY USE

(75) Inventors: Seog-Chan Oh, Royal Oak, MI (US); Alfred Hildreth, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 309 days.

(21) Appl. No.: 13/184,890

(22) Filed: Jul. 18, 2011

(65) Prior Publication Data

US 2013/0024031 A1 Jan. 24, 2013

(51) Int. Cl.
*G05D 11/00* (2006.01)

(52) U.S. Cl.
USPC .............................. 700/291; 709/224; 705/37

(58) Field of Classification Search
USPC .............................. 700/291; 709/224; 705/37
See application file for complete search history.

(56) References Cited

U.S. PATENT DOCUMENTS

| | | | |
|---|---|---|---|
| 6,178,362 B1 * | 1/2001 | Woolard et al. | 700/295 |
| 6,879,884 B2 | 4/2005 | Miyashita et al. | |
| 7,405,013 B2 | 7/2008 | Yang et al. | |
| 7,974,725 B2 | 7/2011 | Gu et al. | |
| 7,996,113 B2 | 8/2011 | Yuan et al. | |
| 2003/0055677 A1 * | 3/2003 | Brown et al. | 705/1 |
| 2003/0061091 A1 * | 3/2003 | Amaratunga et al. | 705/10 |
| 2007/0032911 A1 * | 2/2007 | Clesle et al. | 700/291 |
| 2009/0088884 A1 * | 4/2009 | Yuan et al. | 700/110 |
| 2009/0089700 A1 | 4/2009 | Gu et al. | |
| 2009/0204245 A1 * | 8/2009 | Sustaeta et al. | 700/99 |
| 2009/0204267 A1 * | 8/2009 | Sustaeta et al. | 700/291 |
| 2010/0023534 A1 | 1/2010 | Liu et al. | |
| 2010/0042455 A1 * | 2/2010 | Liu et al. | 705/8 |
| 2010/0168930 A1 * | 7/2010 | Bischof et al. | 700/291 |
| 2010/0286797 A1 | 11/2010 | Liu et al. | |
| 2011/0082596 A1 * | 4/2011 | Meagher et al. | 700/291 |
| 2012/0284077 A1 | 11/2012 | Xiao et al. | |

* cited by examiner

*Primary Examiner* — Mohammad Ali
*Assistant Examiner* — Anthony Whittington
(74) *Attorney, Agent, or Firm* — Harness, Dickey & Pierce, P.L.C.

(57) ABSTRACT

Methods of forecasting and modulating energy consumption at a production facility are provided. The amounts of energy consumed during production and non-production times are used to obtain highly accurate hourly energy use rates for different energy use activities which are used to estimate the amount of energy that will be consumed during a subsequent time period. The forecasting and modulating methods provide a more tailored estimate of energy usage that prevents the unnecessary expense of using on-demand energy without the benefit of a pre-purchased or pre-reserved discount. The forecasting and modulating methods also help prevent overestimation of the amount of energy used.

18 Claims, 1 Drawing Sheet

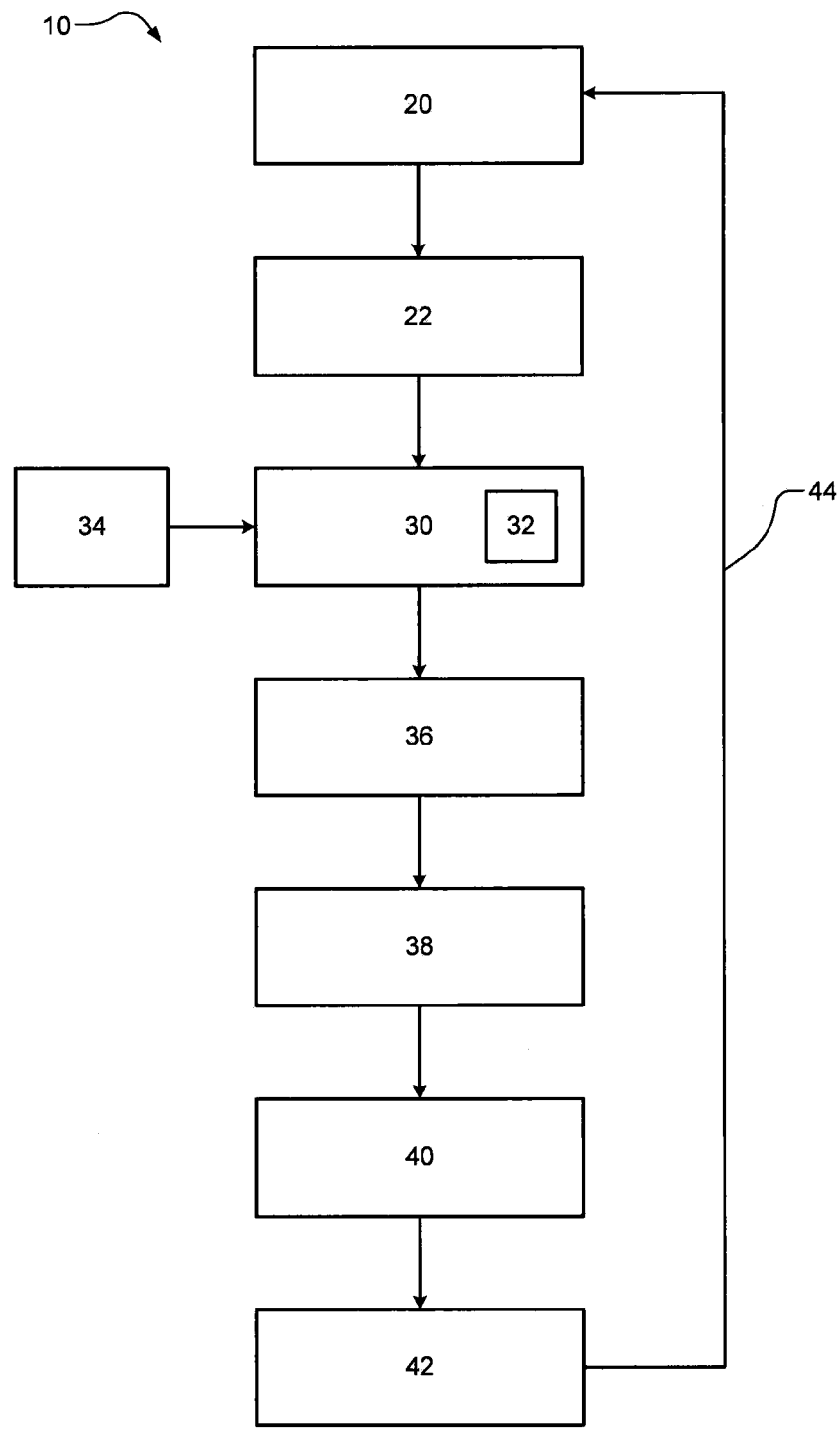

STATISTICAL METHOD TO OBTAIN HIGH ACCURACY IN FORECASTING PLANT ENERGY USE

FIELD

The present disclosure relates to methods forecasting plant energy usage with high accuracy.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Energy use is a large, but mandatory, expense incurred by manufacturers or facility operators. The operation of a production facility requires distinct levels of energy during full-capacity production, reduced capacity production, and non-production periods. To receive a discount on energy prices, energy may be reserved or pre-purchased at a discounted rate. This requires that the manufacturer or facility operator estimate how much energy will be used over a time period. A manufacturer or facility operator does not want to overestimate the amount of energy needed because the unused energy is generally non-refundable. Similarly, a manufacturer or facility operator does not want to underestimate the amount of energy needed because that requires purchasing the energy at a non-discounted rate thereby defeating the benefits of the pre-purchased discount, wasting efforts of estimating the amount of energy needed over a time period, and causing financial burdens due to urgent budget reconciliation To best determine how much energy is needed, forecasting methods have been used. Historically, forecasting methods have been imprecise because they rely on outdated information, they are limited by the subjective variables and model selection considered by the creator of the forecasting method, and/or they do not account for changes in production elements and demands.

SUMMARY

This section provides a general summary of the disclosure and is not a comprehensive disclosure of its full scope or all of its features.

The present teachings provide methods of forecasting energy usage. Meter data and production data are obtained over a first time period to determine energy usage rates during at least one of a production period, a non-production period, and a weekend or holiday non-production period. The amount of energy ($T_e$) required is determined for a target time period using the equation:

$$T_e = \left[\left(\frac{N_v}{JPH}\right) \times e_p\right] + \left[\left((365 - N_{wd}) \times 24 - \left(\frac{N_v}{JPH}\right)\right) \times e_{np}\right] + [N_{wd} \times 24 \times e_{npw}].$$

In the equation, $N_v$ is a number of estimated items produced in a target year period, JPH is a number of items produced per hour, $N_{wd}$ is a total number of weekend days and holidays in the target year, $e_p$ is an energy use (Kilowatt hours) in one production hour during the production period, $e_{np}$ is an energy use (Kilowatt hours) in one non-production hour during the non-production period, and $e_{npw}$ is energy use (Kilowatt hours) in one non-production hour during a weekend or holiday non-production period.

In still other aspects, the present teachings provide methods of modulating energy usage. A first total energy consumption is determined for a first time period by combining a forecasted production period energy consumption and a forecasted non-production period energy consumption for a production facility. An actual production period energy consumption and an actual non-production period energy consumption are obtained. The actual production energy consumption is compared with the forecasted production period energy consumption. The actual non-production period energy consumption is compared with the forecasted non-production period energy consumption. A second total energy consumption is determined for a subsequent consumption period by replacing the forecasted production energy consumption with the actual production energy consumption and by replacing the forecasted non-production period energy consumption with the actual energy consumption if the respective values differ over an equal time period.

In still other aspects, methods of modulating energy consumption are provided. A total energy consumption value for a reference year is provided. The energy required ($T_e$) for a first target period is determined with the equation:

$$T_e = \left[\left(\frac{N_v}{JPH}\right) \times e_p\right] + \left[\left((365 - N_{wd}) \times 24 - \left(\frac{N_v}{JPH}\right)\right) \times e_{np}\right] + [N_{wd} \times 24 \times e_{npw}].$$

In the equation, $N_v$ is a number of estimated items produced in the target time period, JPH is a number of items produced per hour, $N_{wd}$ is a total number of weekend days and holidays in a target year, $e_p$ is an energy use (Kilowatt hours) in one production hour during a production period, $e_{np}$ is an energy use (Kilowatt hours) in one non-production hour during a non-production period, and $e_{npw}$ is energy use (Kilowatt hours) in one non-production hour during a weekend or holiday non-production period, further wherein $e_p$, $e_{np}$, and $e_{npw}$ are data from the reference year. A source of energy is secured for the first target time period based on the estimate of energy required ($T_e$) as calculated using data from the reference year. At least one of the number of estimated items produced ($N_v$), the number of production hours, the number of non-production hours during the production period, and the number of non-production hours during a weekend or holiday non-production period is modified and the energy required is then recalculated for a second target period. The amount of source energy secured for a second target period of time is then modified.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 depicts a process of forecasting an energy use according to various aspects of the present teachings.

DETAILED DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical "or." It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced items. Furthermore, all ranges disclosed herein are inclusive of the endpoints and independently combinable.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

The present teachings provide methods of forecasting energy usage. A generic illustration of an exemplary forecasting process 10 is depicted in FIG. 1. At element 20 meter data is obtained for different activities such as production time and non-production time for weekdays, weekends, and/or holidays. At element 22, the hourly energy usage rates for different activities are prepared by selecting and averaging the appropriate meter data. A computer or controller 30 having the forecasting formula 32 receives the hourly usage rates from element 22 along with the number of jobs per hour (JPH) and non-weekend days as other parameters. The number of items to be produced is obtained at element 34 and input into the forecasting formula. This allows "forecasting" or a prediction of energy consumption during a target forecasting period using the forecasting formula. Using the forecasted value, energy is secured at element 36 through pre-purchase or reservation with the utility company, generally at a large discount.

At element 38, new data for energy consumption are provided as new meter data is generated with the passage of time during the target forecasting period. New meter data is then analyzed at element 40 to determine whether the forecasted energy consumption matches the energy actually consumed. The securing of the energy is modified to either reduce or increase the amount of energy purchased as indicated at element 42. If there is an unacceptable discrepancy between the forecasted energy usage and the true energy usage over a select time period, the process may be iteratively repeated as indicated at line 44. Further details and variations on each of the above elements will be fully addressed below.

Energy includes electricity, gas, water, oil, geothermal, hydropower, solar power, wind power, and the like. While select illustrations may disclose electricity, it is understood that other energy sources may be substituted within the scope of the present disclosure. The disclosed methods and systems are suitable for use in the same facility or across multiple, separate facilities. For example, data may be obtained for a first facility and then used to forecast or modulate energy usage in a separate facility.

The energy forecasting and modulating methods of the present teachings maximize cost reduction and improve energy efficiency of a facility. The cost reduction is a result of the ability to obtain the energy at a discounted rate by "pre-purchasing" the energy or purchasing or reserving in advance a set amount of the energy. By purchasing or reserving a set amount of energy in advance, the energy is generally obtained at a discounted rate. However, there are caveats to reserving or purchasing the energy in advance. First, if the estimated usage is over the amount actually consumed during operation of the facility, there is no refund for the unused energy. Second, if the estimated usage is under the amount actually consumed during operation of the facility, the discount is forfeited for the additional energy consumption. Third, there may be financial penalties for purchasing the energy "on demand" as compared to pre-purchasing the energy.

The present teachings correlate and disaggregate hourly production data and hourly energy usage data to obtain highly accurate hourly energy use rates for different energy use activities. These accurate hourly energy use rates are used to forecast the subsequent year's monthly (or weekly, quarterly, etc.) energy usages. The forecast is a refined energy estimate that prevents energy inefficiencies from overestimating and/or underestimating energy use. By using the methods of the instant teachings, the facility is able to more precisely estimate future energy usage and thus secure through pre-purchase or reservation the appropriate amount of energy to eliminate the detriments of overestimating or underestimating of energy use.

In various aspects, the amount of energy ($T_e$) required is determined for a target time period using the equation:

$$T_e = \left[\left(\frac{N_v}{JPH}\right) \times e_p\right] +$$

-continued $$\left[\left((365 - N_{wd}) \times 24 - \left(\frac{N_v}{JPH}\right)\right) \times e_{np}\right] + [N_{wd} \times 24 \times e_{npw}].$$

In the equation, $N_v$ is a number of estimated items produced in a target year period, JPH is a number of items produced per hour, $N_{wd}$ is a total number of weekend days and holidays in the target year, $e_p$ is an energy use (Kilowatt hours) in one production hour during the production period, $e_{np}$ is an energy use (Kilowatt hours) in one non-production hour during the non-production period, and $e_{npw}$ is energy use (Kilowatt hours) in one non-production hour during a weekend or holiday non-production period.

Determining the amount of energy required using the above-identified equation is referred to herein as "forecasting" the energy usage because the amount of energy required for a future or target period is determined using previously obtained values. To the contrary, "actual" energy usage refers to the energy that is consumed and for which data is obtained, stored, and/or processed to provide the forecasted energy usage. As used herein, the term "target" time period refers to the period for which the energy usage is being estimated.

The "production period" or "production time" refers to the times when item or items are being manufactured or assembled at the facility. This is represented by the component $$\left[\left(\frac{N_v}{JPH}\right) \times e_p\right]$$

of the equation. Generally, the production period is the highest energy usage period for electricity or gas, for example. Not only does the electricity or gas have to provide power for any machinery and lighting, the electricity or gas also has to provide the required temperature control for the facility. The production period includes when the facility is producing the item at maximum capacity or at a reduced capacity.

A "non-production period" or "non-production time" refers to the times at the facility where the item or items are not being manufactured or assembled. The non-production period includes the time between shifts on weekdays (represented by $$\left[\left((365 - N_{wd}) \times 24 - \left(\frac{N_v}{JPH}\right)\right) \times e_{np}\right]$$

in the equation) or the time during weekends or holidays (represented by $[N_{wd} \times 24 \times e_{npw}]$ in the equation). While the non-production period has a reduced energy requirement as compared to the production period, there is still energy consumption required to provide lighting, to maintain machinery in a stand-by mode, to transport items produced within and out of the facility, and/or to provide the appropriate temperature control within the facility.

As an example, in a facility that operates during the weekdays and only during first and second shift, the non-production period includes the time that passes between the end of a second shift and the beginning of the following first shift. The non-production period in such a facility also includes holidays and weekends. It is understood that should the facility have production periods that occur during weekends or holidays, the weekend or holiday days would be incorporated into the production period and excluded as necessary from the non-production period when forecasting energy usage.

Data evaluated in the forecasting formula are provided from utility meters and/or production data that are obtained during operation of the subject facility or during operation of at least one different facility. The data are averaged or otherwise manipulated (to remove outlier information) as needed to properly reflect the energy use. The utility meters include devices that monitor and/or measure the energy amounts delivered and used. Exemplary meters include fuel meters that measure a fuel such as natural gas, oil, coal, and the like. Still other meters include electricity meters that monitor and measure the electricity supplied through an electricity supply line. It is understood that the meter(s) may include communication or storage to retain and transmit the usage information. In various aspects, the data from the meters is recalled from storage, either local or remote. In still other aspects, data 20 is processed by a controller or computer, as non-limiting examples, as part of the data preparation for or the data integration into the forecasting equation.

The production data includes the number of items or components of an item that are produced, manipulated, and/or transported within the facility. The production data may be obtained from inventory records or sales information from storage, either local or remote, and may be recalled from storage, processed by a computer, or manipulated by software, as non-limiting examples, as part of the data preparation for or the data integration into the forecasting equation. The production data further includes information from a marketing, sales, economic conditions, and purchasing trends to determine the actual number of items or components to be produced for a time period.

The meter data and/or production data are obtained over the first time period to determine actual energy usage rates during at least one of the production period, the non-production period, and the weekend or holiday non-production period. The meter data and/or production data are collected and organized and then submitted to controller or computer for processing. The data are regularly updated to allow access to the most current information. This allows an operator or facility manager to conduct ongoing evaluations of the energy usage, to provide better forecasting modifications for future energy use in the target time period, and to modify the amount of energy secured through pre-purchase or reservation.

For example, meter and/or production data is kept current for a rolling period of from one-week to about one year, and all sub-ranges. Rolling periods in various aspects include a one-week period, a-day period, or a three month period. The continuous updating of the meter and/or production data allows the facility manager or operator to make adequate modifications to the energy reservation or pre-purchasing based on the most current data or based on other historical data from previous time periods.

After forecasting the amount of energy required at element using data from actual consumption (or from an operating facility), the amount of energy reserved or pre-purchased is modified for the target time period. In such aspects, the amount of energy reserved or pre-purchased for a first time period is different from the amount of energy reserved or pre-purchased for a second time period, such as the target time period.

As a non-limiting example, stored data from the utility meters is used to determine the total energy for a reference year. The energy consumption indicates that during the months of June through August of the reference year, a certain amount of energy was consumed. For a second time period, or for the target time period of the months of June through August of a subsequent year, a more tailored forecast of the energy usage is obtained by altering a value placed into the above-identified formula, where the value represents a change in manufacturing demands. For example, if it is known that the number of items manufactured will be increased in the target time period of June through August for a subsequent year, the amount of energy secured, reserved, or pre-purchased is increased in advance of the target time period. This allows the facility to benefit from any full discount for reserving or pre-purchasing the energy. As another example, the energy consumption may be modified in light of the change in building conditions, such as modernizing insulation in the building. Further, the energy consumption may be modified in light of unexpected or outlier weather conditions for a first time period. For example, should there be a series of storms that require the manufacturing facility to temporarily cease operations during a first time period, the forecasted energy usage for the second time period may be increased to compensate for the missed days of operation during the first time period.

In various aspects, a separate or the same controller or computer or an operator receives a visual, audio, or tactile signal to prompt changing the amount of energy that is reserved or pre-purchased. The signal is provided real-time at the facility or it is provided at a remote location over a network, intranet, or internet. If upon being alerted by the signal, the operator determines that energy usage will be overestimated for the select time period, the energy for any subsequent purchasable units of time may be lowered as needed. To lower or increase the energy amount to be purchased, the computer or operator can submit a request to the energy supply company for the forecasted energy delivery amount. In various aspects, the request is submitted as an order in person, over the phone, over a computer, or using internet communications.

In still other aspects, the present teachings provide methods of modulating energy usage. The methods are generally detailed below and followed by specific details. A first total energy consumption is determined during a target time period by combining a forecasted production period energy consumption and a forecasted non-production period energy consumption for a production facility. An actual production period energy consumption and an actual non-production period energy consumption are obtained. The actual production energy consumption is compared with the forecasted production period energy consumption. The actual non-production period energy consumption is compared with the forecasted non-production period energy consumption. A second total energy consumption is determined for a subsequent consumption period by replacing the forecasted production energy consumption with the actual production energy consumption and by replacing the forecasted non-production period energy consumption with the actual energy consumption if the respective values differ over an equal time period of from about one week to about one year, including all sub-ranges, including from about one month to about three months. This iterative feature is indicated at element 44.

As detailed above, the forecasted values include those that are predicted based on historical data using the equation, for example, while the actual values are those that are obtained during the operation of the facility. The amount of energy secured or pre-purchased is decreased for the subsequent consumption period if the second total energy consumption is lower than the first total energy consumption. Conversely, the amount of energy secured or pre-purchased is increased for the subsequent consumption period if the second total energy is greater than the first total energy consumption.

The meter data and/or the production data are updated as detailed above. Still further, signals such as the tactile feedback, sound, and/or visual indicators are also provided. These signals allow the operator to or instruct the computer or control module to modify the amount of energy to be secured. The amount of energy consumption modified may be for an immediately adjacent time period, such as a modification made in July of a select year for energy securing for August of the same year. The amount of energy consumption modified may also be for the same time period but for a different year, such as an interpretation of the meter and production data from February of year one to be used to modify the energy consumption from February of immediately following year two.

In still other aspects, methods of modulating energy consumption are provided. A total energy consumption value for a reference year is provided. The energy required ($T_e$) for a target period is determined with the equation:

$$T_e = \left[\left(\frac{N_v}{JPH}\right) \times e_p\right] + \left[\left((365 - N_{wd}) \times 24 - \left(\frac{N_v}{JPH}\right)\right) \times e_{np}\right] + [N_{wd} \times 24 \times e_{npw}].$$

In the equation, $N_v$ is a number of estimated items produced in the target time period, JPH is a number of items produced per hour, $N_{wd}$ is a total number of weekend days and holidays in a target year, $e_p$ is an energy use (Kilowatt hours) in one production hour during a production period, $e_{np}$ is an energy use (Kilowatt hours) in one non-production hour during a non-production period, and $e_{npw}$ is energy use (Kilowatt hours) in one non-production hour during a weekend or holiday non-production period, further wherein $e_p$, $e_{np}$, and $e_{npw}$ are data from the reference year.

A source of energy is secured for a first period of time based on the estimate of energy required ($T_e$) as calculated using data from the reference year. At least one of the number of estimated items produced ($N_v$), the number of production hours, the number of non-production hours during the production period, and the number of non-production hours during the weekend or holiday non-production period is modified and the energy required is then recalculated for the second target time period. The amount of source energy secured for a second period of time is then modified to prevent overestimating or underestimating energy usage and thus allow for advance purchase or reservation of the respective utility with high accuracy.

The operations and analysis performed in the present teachings may be implemented by a computer or controller 30, may be performed by an individual, or may be performed by a combination of the computer or controller 30 and the individual. The method steps, processes, and operations described herein are not to be construed as necessarily requiring their performance in the particular order discussed or illustrated, unless specifically identified as an order of performance. It is also to be understood that additional or alternative steps may be employed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of forecasting energy usage for a production facility, the method comprising:
   obtaining, by a control module, meter data and production data over a first time period to determine energy usage rates during a production period, a non-production period, and a weekend/holiday non-production period;
   predicting, by the control module, an amount of energy ($T_e$) required for a target year period using the equation:

$$T_e = \left[\left(\frac{N_v}{JPH}\right) \times e_p\right] + \left[\left((365 - N_{wd}) \times 24 - \left(\frac{N_v}{JPH}\right)\right) \times e_{np}\right] + [N_{wd} \times 24 \times e_{npw}],$$

wherein $N_v$ is a number of estimated items to be produced in the target year period at the production facility, JPH is a number of items produced per hour, $N_{wd}$ is a total number of weekend days and holiday days in the target year period, $e_p$ is an energy use in one production hour during the production period, $e_{np}$ is an energy use in one non-production hour during the non-production period, and $e_{npw}$ is an energy use in one non-production hour during the weekend/holiday non-production period; and
   pre-purchasing a first amount of energy for the production facility, wherein the first amount of energy is based on the predicted amount of energy ($T_e$).

2. The method of claim 1, further comprising modifying the first amount of energy.

3. The method of claim 2, wherein the first amount of energy is different from an amount of energy used during the first time period, where the target year period and the first time period are of the same duration.

4. The method of claim 1, further comprising updating the meter data and the production data.

5. The method of claim 4, wherein at least one of the meter data and the production data is updated to provide current energy information for a period of from about one week to about three months.

6. The method of claim 1, further comprising providing a visual, audio, or tactile signal to prompt making a change in the first amount of energy.

7. The method of claim 6, further comprising transmitting the visual, audio, or tactile signal to a remote location.

8. The method of claim 1, wherein the energy includes electricity, and wherein the energy use values $e_p$, $e_{np}$, and $e_{npw}$ are expressed in units of kilowatt-hours.

9. The method of claim 1, further comprising determining the energy use values $e_p$, $e_{np}$, and $e_{npw}$ from the meter data and the production data.

10. The method of claim 9, wherein the first time period is a year-long period immediately prior to the target year period.

11. The method of claim 1, further comprising adjusting the first amount of energy in response to a change in one or more of $N_v$, JPH, or $N_{wd}$.

12. A non-transitory tangible computer readable medium storing a computer program including processor-executable instructions, the processor-executable instructions comprising:
   obtaining meter data and production data over a first time period to determine energy usage rates during a production period, a non-production period, and a weekend/holiday non-production period;
   predicting an amount of energy ($T_e$) required for a target year period at a production facility using the equation:

$$T_e = \left[\left(\frac{N_v}{JPH}\right) \times e_p\right] + \left[\left((365 - N_{wd}) \times 24 - \left(\frac{N_v}{JPH}\right)\right) \times e_{np}\right] + [N_{wd} \times 24 \times e_{npw}],$$

wherein $N_v$ is a number of estimated items to be produced in the target year period at the production facility, JPH is a number of items produced per hour, $N_{wd}$ is a total number of weekend days and holiday days in the target year period, $e_p$ is the energy usage rate per hour during the production period, $e_{np}$ is the energy usage rate per hour during the non-production period, and $e_{npw}$ is the energy usage rate per hour during the weekend/holiday non-production period; and
   pre-purchasing a first amount of energy for the production facility, wherein the first amount of energy is based on the predicted amount of energy ($T_e$).

13. The non-transitory tangible computer readable medium of claim 12, wherein the processor-executable instructions further comprise outputting a visual, audio, or tactile signal to prompt making a change in the first amount of energy.

14. The non-transitory tangible computer readable medium of claim 13, wherein the processor-executable instructions further comprise transmitting the visual, audio, or tactile signal to a remote location for output at the remote location.

15. The non-transitory tangible computer readable medium of claim 12, wherein the energy includes electricity, and wherein the energy use values $e_p$, $e_{np}$, and $e_{npw}$ are expressed in units of kilowatt-hours.

16. The non-transitory tangible computer readable medium of claim 12, wherein the processor-executable instructions further comprise determining the energy usage rates $e_p$, $e_{np}$, and $e_{npw}$ from the meter data and the production data.

17. The non-transitory tangible computer readable medium of claim 16, wherein the first time period is a year-long period immediately prior to the target year period.

18. The non-transitory tangible computer readable medium of claim 12, wherein the processor-executable instructions further comprise adjusting the first amount of energy in response to a change in one or more of $N_v$, JPH, or $N_{wd}$.

* * * * *